US006904055B2

(12) United States Patent
Pichna et al.

(10) Patent No.: US 6,904,055 B2
(45) Date of Patent: Jun. 7, 2005

(54) AD HOC NETWORKING OF TERMINALS AIDED BY A CELLULAR NETWORK

(75) Inventors: Roman Pichna, Espoo (FI); Keijo Lähetkangas, Oulu (FI); Kai Mustonen, Oulu (FI)

(73) Assignee: Nokia Corporation, Espoo (FI)

( * ) Notice: Subject to any disclaimer, the term of this patent is extended or adjusted under 35 U.S.C. 154(b) by 235 days.

(21) Appl. No.: 10/179,397

(22) Filed: Jun. 24, 2002

(65) Prior Publication Data

US 2003/0235174 A1 Dec. 25, 2003

(51) Int. Cl.⁷ .................................................. H04J 3/16
(52) U.S. Cl. ...................................... 370/467; 370/352
(58) Field of Search ................................ 370/313, 352, 370/400, 401, 465, 467

(56) References Cited

U.S. PATENT DOCUMENTS

| | | | | |
|---|---|---|---|---|
| 2001/0024443 A1 * | 9/2001 | Alriksson et al. | ........... | 370/401 |
| 2002/0191575 A1 * | 12/2002 | Kalavade et al. | ........... | 370/338 |
| 2003/0035437 A1 * | 2/2003 | Garahi et al. | ............... | 370/465 |
| 2003/0058832 A1 * | 3/2003 | Knauerhase et al. | ........ | 370/349 |
| 2003/0095504 A1 * | 5/2003 | Ogier | ......................... | 370/235 |

FOREIGN PATENT DOCUMENTS

WO     WO 01/15387     3/2001

* cited by examiner

*Primary Examiner*—John Pezzlo
*Assistant Examiner*—Donald L Mills
(74) *Attorney, Agent, or Firm*—Darby & Darby PC

(57) ABSTRACT

A fast and secure ad hoc communication system is established between terminals with the aid of a network. Terminals equipped with a non-cellular interface may establish a high data rate peer-to-peer or multi-hop ad hoc connection with the support of a cellular network. The cellular network may provide signaling for user authentication, peer identification, key distribution for a secure non-cellular connection set-up, radio resources management messages, routing assistance information, as well as charging and billing for the service. A non-cellular link may be used for fast and secure ad hoc communication between the terminals. Signaling may be transported either over a non-cellular access network or, using dual-mode terminals, over the cellular RAN. A combination of the signaling transports is also possible.

37 Claims, 6 Drawing Sheets

AD HOC NETWORKING OF TERMINALS AIDED BY A CELLULAR NETWORK

FIELD OF THE INVENTION

The present invention relates to IP networks, and more particularly to establishing ad hoc networking among terminals aided by a cellular network.

BACKGROUND OF THE INVENTION

The development of mobile communication devices and mobile networks has advanced at a rapid rate. At first, analog mobile networks enabled voice communication and simple paging features. Later, digital mobile networks provided more advanced features for voice and data communication, such as encryption, caller identification and short message service (SMS) text messages. More recently, third generation (3G) mobile IP network technology is being developed to enable users to easily access content rich media, information and entertainment with mobile devices.

As networks advance, WLAN cellular networking is becoming an intensely discussed issue. Many see WLAN as an important component in the 3G evolution. For example, 3GPP is currently conducting feasibility studies on WLAN/UMTS interworking. The interest is not limited to 3GPP only but has also drawn attention at 3GPP2 and the Mobile Wireless Internet Forum (MWIF). Other evolution paths for interworking between cellular networks and ad hoc capable networks can be seen in e.g. Bluetooth, Infrared and Wireless Routing (WR).

Exchanging data between two mobile terminals may be costly if conducted over the cellular infrastructure or if the terminals are co-located. Using a WLAN, Bluetooth or Infrared, or any other peer-to-peer interface for keeping a high rate (and possibly also volume) traffic local is efficient from a cost, bandwidth and spectrum usage point of view. Current WLAN, infrared (IR) and emerging Bluetootb/IEEE 802.15 (BT) standards would allow for the interface, but it is very difficult and clumsy to achieve a desired trusted security level between the terminals. Typically the connection set-up has would be done manually. Additionally, cellular operator revenue is lost when only using a WLAN/BT/IR/WR, or other non-cellular connection. A problem, however, is that current solutions offer limited functionality and usability. Current connection setup is standardized, e.g., for WLAN in IEEE 802.11b.

What is needed is a way to establish secure links using cellular operator-controlled devices and a way for an operator to be involved in local traffic exchange that bypasses the infrastructure and thus offers a tool for additional revenue that would otherwise escape the operator. It is with respect to these considerations and others that the present invention has been made.

SUMMARY OF THE INVENTION

The present invention is directed at addressing the above-mentioned shortcomings, disadvantages and problems, and will be understood by reading and studying the following specification.

According to one aspect of the invention, mobile nodes equipped with a non-cellular wireless interface may establish a high data rate peer-to-peer ad hoc connection with the support of a cellular network. The cellular network may provide signaling for user authentication, peer identification, authentication key distribution for a secure non-cellular connection set-up, radio resources management messages, as well as charging and billing for the service. This is especially true, if one of the terminals is a server of music, games, streaming video, and the like.

According to another aspect of the invention, the non-cellular link may be used for fast and secure ad hoc communication between the terminals. Signaling may be carried either over a non-cellular wireless access network or, using dual-mode terminals, over the cellular Radio Access Network (RAN). A combination of the signaling transport media is also possible. For example, one user may carry signaling over a WLAN RAN and the other user may carry signaling over a cellular system.

According to yet another aspect of the invention, the cellular system is not limited to the Universal Mobile Telecommunications System (UMTS). Cellular network, as used in this application refers to any mobile network operated by an operator. For example, without limiting to these, the cellular network can be a GSM, GPRS, UMTS, using various radio access network technologies, such as CDMA2000, WCDMA and WLAN. Similarly, the non-cellular network and interface for the ad-hoc link may be any of the family of short range radios including BRAN Hiperlan, Hiperlan2, IEEE 802.11a,b,g, Multimedia Mobile Access Communication (MMAC) High-Speed Wireless Access (HISWA), Bluetooth, IEEE 802.15, and the like. The short range connection may even be a wired or infrared connection without departing from the spirit of this invention.

According to a further aspect of the invention, a cellular infrastructure is used to identify and authenticate the mobile users, and deliver one or more encryption keys or tokens for a secure non-cellular link establishment. Number and kind of needed encryption keys or security association tokens is dependent on the security method(s) employed in the network, which is not a part of this invention. Any kind of suitable security method(s) can be employed in accordance to this invention. This eases the process and possibly generates additional revenue for an operator. For instance, the authentication and encryption (security) signaling services provided by the cellular network could be charged for. Another example for chargeable services can be routing assistance based on a dynamically updated register in the cellular network, which creates a description of the ad hoc network and provides optimized routing information for mobile nodes based on that description. Yet another example of such chargeable services is QoS (quality of service) support provided by the cellular infrastructure and supervised by the operator. In addition, if one of the terminals offers commercial services, this arrangement allows reusing the cellular billing infrastructure for charging for the service.

According to still yet another aspect of the invention, a terminal is provided, which is able to communicate over ad hoc communication links with assistance provided from the cellular network for establishing the communication. The terminal receives information optimized for the terminal from the cellular network used in establishing communication links.

According to a further aspect of the invention, a network node associated with cellular network for providing services associated with an ad hoc network can form descriptions of an ad hoc network for terminals associated with an ad hoc network. The network node receives requests for assistance from terminals for assistance in establishing a communication link. In response to the request, the network node provides an optimized answer to the terminal. The optimized answer may provide information relating to routing, quality enhancement, and security and authentication. According to one embodiment of the invention, the network node provides server or register functionality.

DETAILED DESCRIPTION OF THE PREFERRED EMBODIMENT

Figure 1:
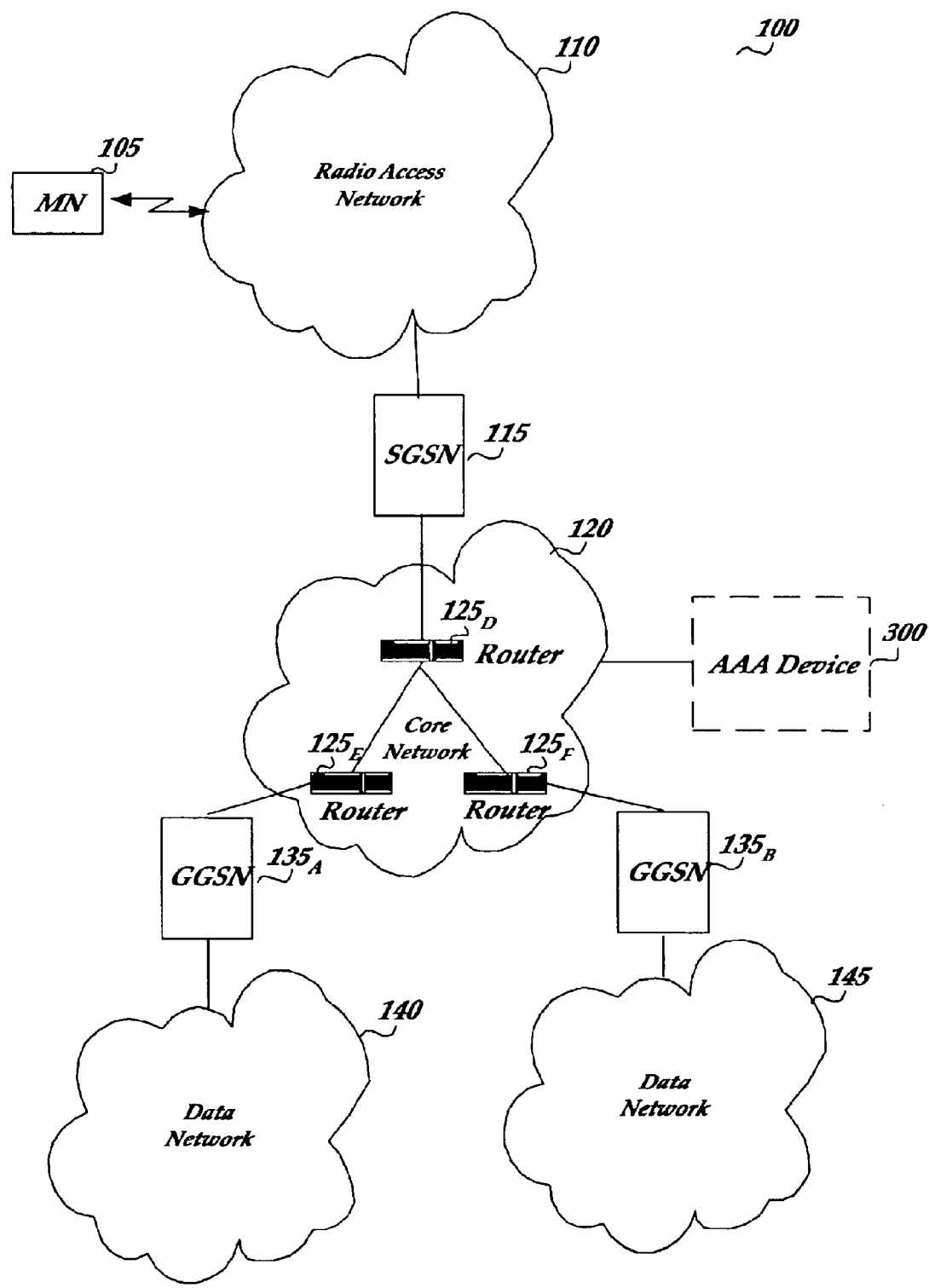
FIG. 1 illustrates an exemplary cellular network in which the invention may operate.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "node" refers to a node on a network. The term "mobile node" and "terminal" refer to a node on the network that is mobile. The term "flow" means a flow of packets. The term "support node" refers to both "GGSN" and "SGSN" nodes. The term "user" refers to any person or customer such as a business or organization that employs a mobile device to communicate or access resources over a mobile network. The term "operator" refers to any technician or organization that maintains or services something, such as a network. The term "identifier" refers to a user address, an IMSI code, an MSISDN number, an IP address, or any other information that relates to the location or identity of the user or equipment.

In an exemplary implementation described in this application, AAA (Authentication, Authorization and Accounting) device is referred. AAA is an IETF standard developed by the Authentication, Authorization and Accounting (AAA) Working Group. The work of this group is ongoing, and a reference is made to the proceedings of this working group, both existing and forthcoming, (http://www.ietfor.g/html.charters/aaa-charter.html) in its entirety. Instead of AAA, any other existing or future system and method can be employed for authentication, authorization and accounting without departing from the spirit of this invention.

The term "AAA device" refers to any device that offers the functionality of an AAA server generally associated with an IP network. Other nodes or systems of cellular networks may offer the AAA functionality. There include, but are not limited too, entities as charging centers, gateways, resource management entities, user profiles stored in location registers etc Referring to the drawings, like numbers indicate like parts throughout the views. Additionally, a reference to the singular includes a reference to the plural unless otherwise stated or is inconsistent with the disclosure herein.

Illustrative Operating Environment

With reference to FIG. 1, an exemplary cellular network coupled with data networks, in which the invention may operate is illustrated. As shown in the figure, network 100 includes mobile node (MN) 105, radio access network (RAN) 110, SGSN 115, core network 120, routers $125_{D-F}$, optional authentication, authorization, and accounting (AAA) server 300, GGSNs $135_{A-B}$, data network 140, and data network 145.

The connections and operation for network 100 will now be described. MN 105 is coupled to radio access network (RAN) 110. Generally, MN 105 may include any device capable of connecting to a wireless network such as radio access network 110. Such devices include cellular telephones, smart phones, pagers, radio frequency (RF) devices, infrared (IR) devices, integrated devices combining one or more of the preceding devices, and the like. MN 105 may also include other devices that have a wireless interface such as Personal Digital Assistants (PDAs), handheld computers, personal computers, multiprocessor systems, microprocessor-based or programmable consumer electronics, network PCs, wearable computers, and the like.

Radio Access Network (RAN) 110 manages the radio resources and provides the user with a mechanism to access core network 120. Radio access network 110 transports information to and from devices capable of wireless communication, such as MN 105. Radio access network 110 may include both wireless and wired components. For example, radio access network 110 may include a cellular tower that is linked to a wired network. Typically, the cellular tower carries communication to and from cell phones, pagers, and other wireless devices, and the wired network carries communication to regular phones, long-distance communication links, and the like.

Some nodes may be General Packet Radio Service (GPRS) nodes. For example, Serving GPRS Support Node (SGSN) 115 may send and receive data from mobile nodes, such as MN 105, over RAN 110. SGSN 115 also maintains location information relating to MN 105. SGSN 115 communicates between MN 105 and Gateway GPRS Support Node (GGSN)s $135_{A-B}$ through core network 120. According to one embodiment of the invention, AAA device 300 communicates with core network 120.

Core network 120 may be an IP packet based backbone network that includes routers, such as routers $125_{D-F}$, to connect the support nodes in the network. Routers are intermediary devices on a communications network that expedite message delivery. On a single network linking many computers through a mesh of possible connections, a router receives transmitted messages and forwards them to their correct destinations over available routes. Routers may be a simple computing device or a complex computing device. For example, a router may be a computer including memory, processors, and network interface units.

GGSNs $135_{A-B}$ are coupled to core network 120 through routers $125_{A-C}$ and act as wireless gateways to data networks, such as network 140 and network 145. Networks 140 and 145 may be the public Internet or a private data network. GGSNs 135$_{A-B}$ allow MN 105 to access network 140 and network 145.

Briefly described, AAA device 300 may be used to monitor and aid in carrying out the operator's control for the communication through ad hoc networks. AAA device 300 may be coupled core network 120 through communication mediums. AAA device 300 may be programmed by an operator with instructions to manage the policies relating to mobile network 100. AAA device 300 is an optional element.

The operator may set threshold levels to determine whether or not to accept a new flow based on different service classes for a particular user or group of users. The routers, or a dedicated network element, such as AAA device 300, may be used for this purpose. Utilizing an AAA device helps to enforce authentication, authorization, and accounting rules to help ensure end-to-end quality of service (QoS) for users. Operators have the flexibility to provide different AAA rules. For example, conversational traffic may be mapped into either the Expedited Forwarding (EF) class or Assured Forwarding (AF) class at the core network. The operator may employ a different charging structure for each class. Also, AAA rules may be established nodes using different signaling transports.

Furthermore, computers, and other related electronic devices may be connected to network 140 and network 145. The public Internet itself may be formed from a vast number of such interconnected networks, computers, and routers. Mobile network 100 may include many more components than those shown in FIG. 1. However, the components shown are sufficient to disclose an illustrative embodiment for practicing the present invention.

The media used to transmit information in the communication links as described above illustrate one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 2:
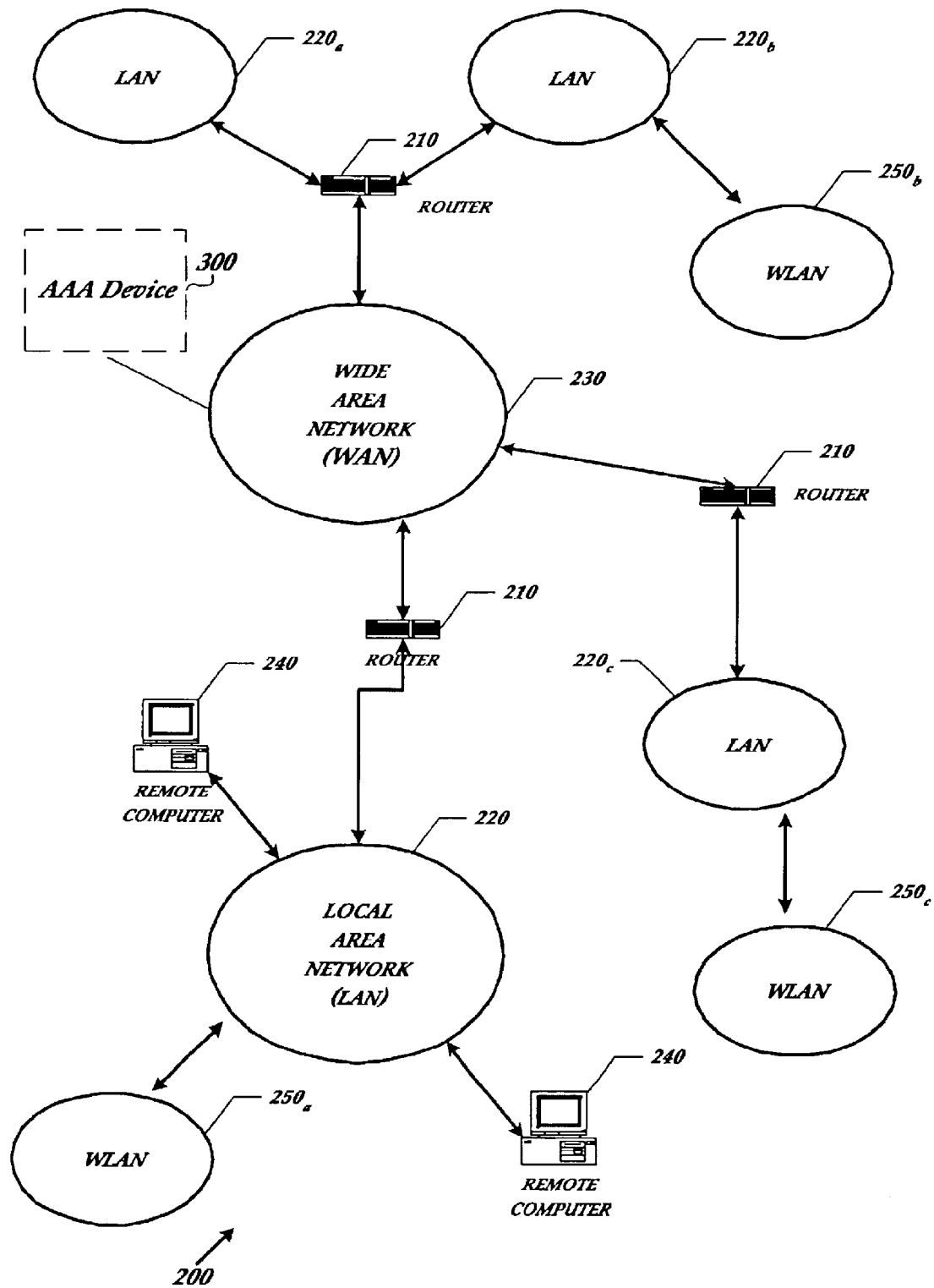
FIG. 2 shows a schematic diagram that illustrates an exemplary system overview in which local area networks and a wide area network are interconnected by routers.

FIG. 2 shows another exemplary system in which the invention operates in which a number of local area networks ("LANs") 220$_{a-d}$, wireless local area networks 250$_{A-C}$, and wide area network ("WAN") 230 interconnected by routers 210. Optionally, AAA device 300 may be coupled to various places within the system to provide AAA services. On an interconnected set of LANs and WLANs—including those based on differing architectures and protocols—, a router acts as a link between LANs, enabling messages to be sent from one to another.

Communication links within LANs typically include twisted wire pair, fiber optics, or coaxial cable, wherein communication links within WLANs include wireless links, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links. Furthermore, computers, such as remote computer 240, and other related electronic devices can be remotely connected to either LANs 220$_{a-d}$ or WAN 230 via a modem and temporary telephone link. The number of WANs, LANs, and routers in FIG. 2 may be increased or decreased without departing from the spirit or scope of this invention. As such, the Internet itself may be formed from a vast number of such interconnected networks, computers, and routers and that an embodiment of the invention could be practiced over the Internet without departing from the spirit and scope of the invention. It should be noted that instead of a WLAN (as defined in IEEE 802.11 standards), the WLAN in this example may represent any kind of a wireless local area network, i.e. such as Bluetooth wireless network.

AAA device 300 may include program code that maintains the rules to charge and authorize the user for the ad hoc non-cellular connections set-up between terminals.

Figure 3:
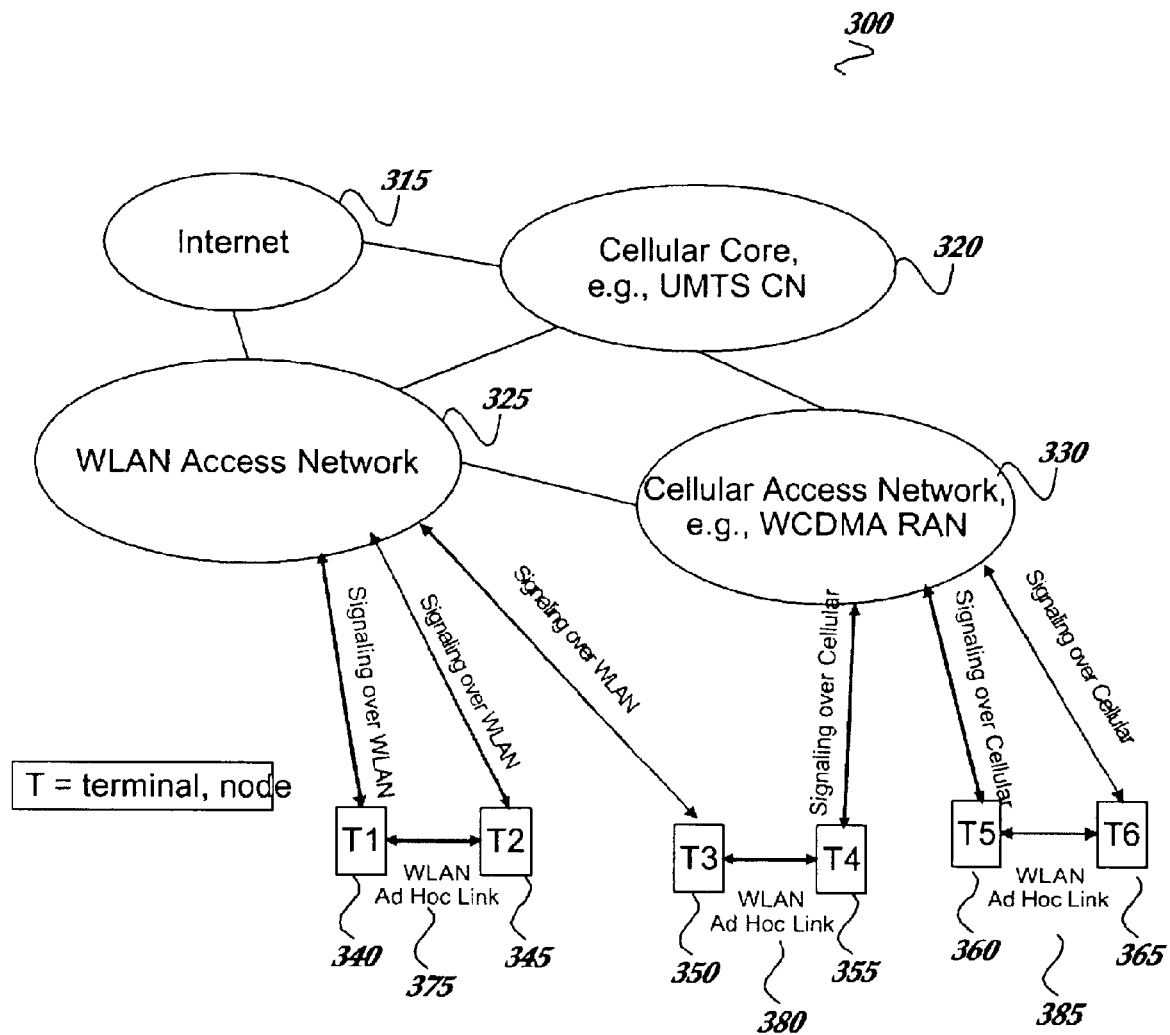
FIG. 3 shows exemplary ad hoc networking of terminals over a Non-Cellular interface aided by a cellular network.

Ad Hoc Networking of Terminals Over Non-Cellular Interface Aided by a Cellular Network FIG. 3 shows exemplary ad hoc networking of terminals over a Non-Cellular interface aided by a cellular network, in accordance with aspects of the invention. For purposes of this discussion the non-cellular interface will be a WLAN access network. Again, this non-cellular interface can be provided by any kind of non-cellular access network without departing from the spirit of this invention. As shown in the figure, network 300 includes four domains; Internet 315, Cellular Core Network 320, Cellular Access Network 330, and WLAN Access Network 325. Terminals T1 340, T2 345, T3 350, T4 355, T5 360, and T6 365.

WLAN Access Network 325 can be attached to the cellular network at different levels.

As shown in the figure, terminals (T1–T6) are paired together (T1 and T2, T3 and T4, and T5 and T6) and show exemplary WLAN ad hoc links established (375, 380, and 385, respectively). Terminals T1, T2, and T3 use WLAN access network 325 for signaling. Terminals T4, T5, and T6 use cellular access network 330 for signaling.

The signaling for the purpose of secure and easy non-cellular ad hoc link establishment is transported to the cellular network. For WLAN-only terminals or dual mode terminals currently associated with WLAN access, the signaling is transported over the WLAN access network (T1–T2). For dual-mode, WLAN and cellular, the signaling for the terminals can be transported either over the WLAN link to WLAN access network or cellular link to cellular access network (T3–T4, T5–T6). Both terminals do not have to use the same access network for the signaling. For example, terminal T3 and terminal T4 use different access networks. Terminal T3 uses WLAN access network 425 and terminal T4 uses cellular access network 430.

The information transferred over the signaling link may include many different types of information. For example, the information may include user authentication, user ID retrieval (e.g., WLAN interface MAC address), security parameters, encryption keys and/or authorization and security association tokens allowing for secure WLAN ad hoc link establishment, radio resource management messages, and the like.

A multi-hop ad hoc network may also be implemented where users' connection is established locally aided by each user's control connection to the infrastructure as described above. (See FIG. 4 and related discussion). To allow for an easy WLAN ad hoc link establishment, the peer's identifier is passed to the cellular network. The identifier could be the International Mobile Station Identity (IMSI) code (or equivalent) in WLAN terminal or in dual-mode terminal also in the non-WLAN part, user name (and operator), ISDN telephone number, network access identifier (NAI) or anything that can easily be communicated between users (verbal exchange of identities) or terminals (e.g., RF tags, identity broadcast over any medium, bar code, etc.).

Figure 4:
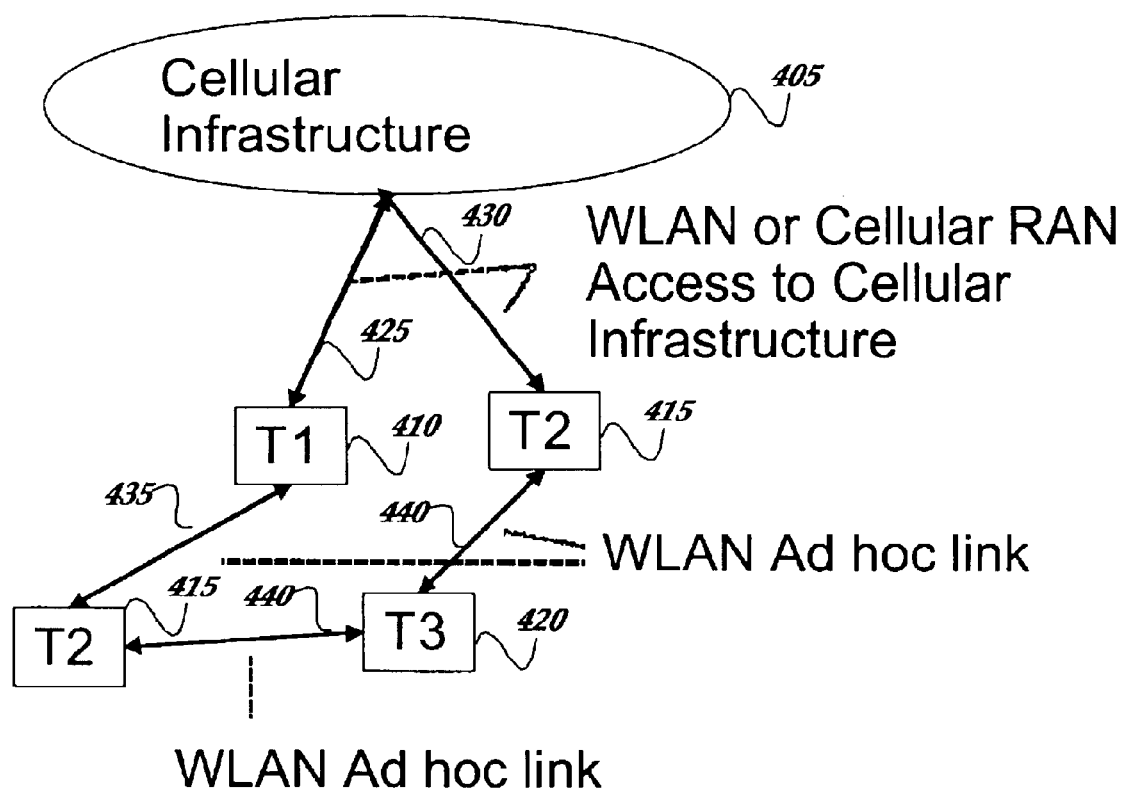
FIG. 4 shows exemplary ad hoc network in which some of the terminals employ a non-direct connection (i.e. a multi-hop connection) to the cellular network.

FIG. 4 illustrates a multi-hop signaling system that may be used in accordance with aspects of the invention. As illustrated in the figure, multi-hop signaling system 400 includes cellular infrastructure 405, terminal T1 (410), terminal T2 (415), terminal T3 (420), access links to cellular infrastructure 425 and 430, and WLAN ad hoc links 435, and 440.

In order for some terminals to access the services provided by the cellular network, multi-hop signaling may be used. Terminals may not have direct access to the services provided by cellular infrastructure 405 for many reasons. For example, some terminals may only include a radio interface that is configured for a non-cellular network. Additionally, other terminals which are dual-mode terminals may be outside of the cellular network coverage. These dual-mode terminals, however, may be capable of connecting to a non-cellular network. Using the multi-hop signaling allows the terminals to reach the services provided by the cellular network according to this invention.

Figure 5:
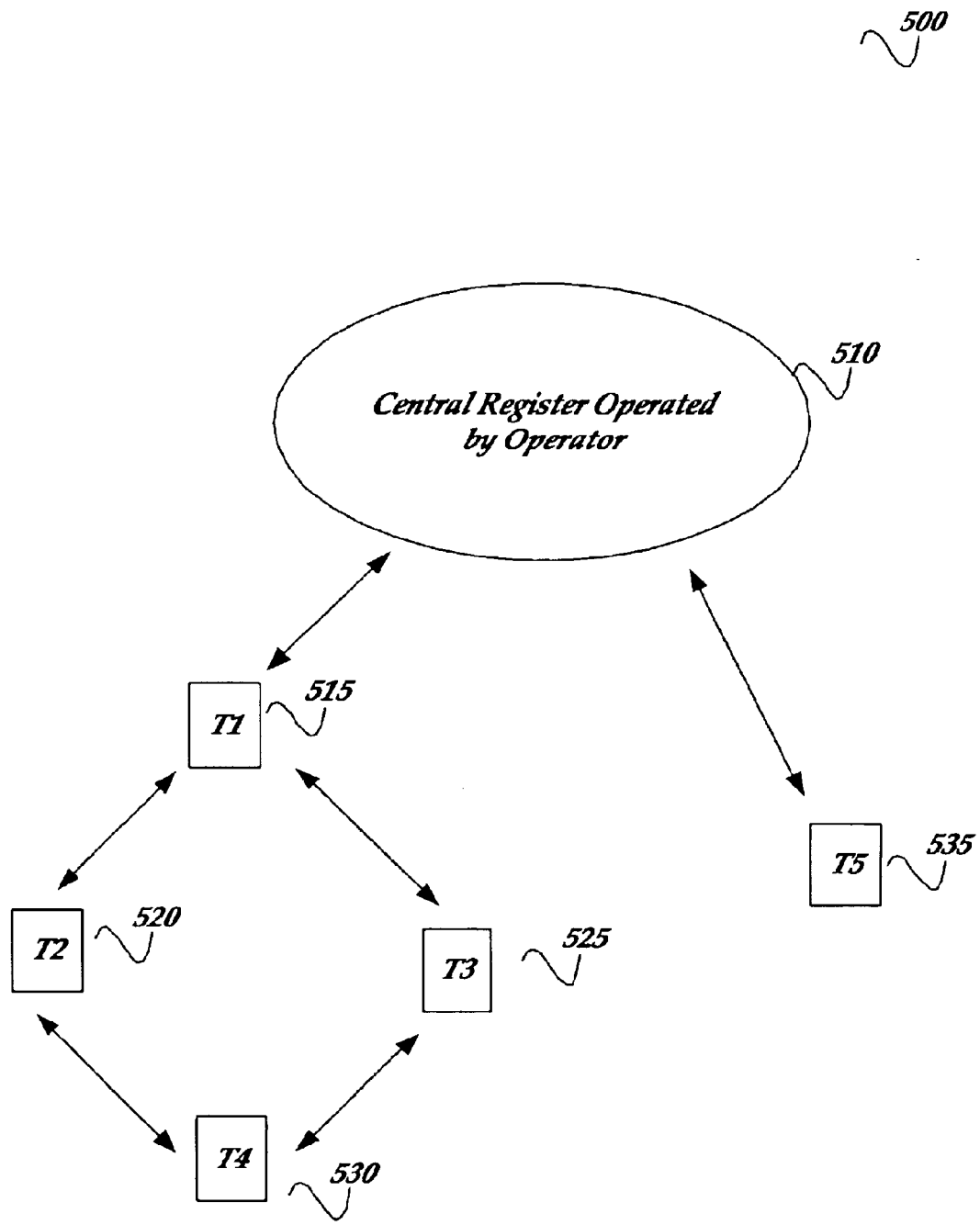
FIG. 5 illustrates an operator controlled central register system.

As illustrated in the figure, terminal T3 (420) does not have direct access to cellular infrastructure 405. Terminal T3 may reach the services provided by cellular infrastructure, however, through terminal T2. Terminal T3 communicates with terminal T2 through WLAN ad hoc link (440). At some points in time, terminals T1 (410) and T2 (415) are directly connected to the services provided by cellular infrastructure 405 through links 425 and 430. At other points in time, however, terminals may be outside of the cellular network coverage. In this situation, a terminal, such as terminal T2 (415) may still have an ad hoc link. According to this particular example, terminal T2 maintains a WLAN ad hoc link (435) with terminal T1. As can be seen, this multi-hop signaling allows terminals to reach the services provided by the cellular network FIG. 5 illustrates an operator controlled central register system, in accordance with aspects of the invention. As illustrated in the figure, central register system 500 includes mobile nodes T1 515, T2 520, T3 525, T4 530, and T5 535 and central register 510. Terminals T1, T2, T3 and T4 are arranged such that they may communicate with each other using a non-cellular link. Terminal T5, however, uses a cellular link in its communication with terminals T1, T2, T3, and T4.

Mobile nodes, such as cellular phones, or PDA's with cellular cards, may utilize central register 510 operated a by an operator for organizing the ad hoc network and for routing the packets to a destination node. According to one embodiment of the invention, the mobile nodes in the network have both cellular (e.g. GPRS, GSM, UMTS) radio and non-cellular radio interfaces (e.g. Bluetooth, IR or WLAN).

This operator may be the cellular operator for the users of the mobile node or a third party operator. The nodes in the ad hoc network have an option to use the operator-assisting service over the cellular radio, or try to manage without the service. According to one embodiment of the invention, the optional use of assistance is included in a routing algorithm in the nodes. When using the operator-assisted service, the nodes send regular update information of themselves over the cellular connection. The assisting service utilizes a standardized signaling scheme between the assisting servers and the mobile nodes. The standardized signaling scheme allows the nodes to communicate amongst themselves and the common operator. An advantage of the service is that the use of the service improves the quality of the ad hoc connection. Some of the services the operators may provide for the mobile nodes in the ad hoc network include: ad hoc network topology to assist in routing, service discovery, servers for ad hoc network applications like gaming or authentication, authorization and security functions, location related information, and the like. The scope of the service may be either micro-mobility within an ad hoc network link layer, in which case the macro-mobility in IP layer would be taken care by the mobile-IP, or both micro and macro-mobility, in which case it would be an alternative to mobile IP (Central Home agent operated by the operator).

As mentioned above, the mobile nodes send information about their neighbourhood to central register 510. For example, nodes within a Bluetooth neighbourhood may send update information to central register 510 when the nodes realize there has been a change in their neighbourhood. This change information of the neighbourhood may include e.g. information of new Bluetooth, WLAN or other ad hoc connections to new mobile phones or information of loosing a Bluetooth, WLAN or other ad hoc connection to certain mobile phones. Sending of information may be done via the cellular connection, which may be for example a GPRS, GSM or UMTS connection, or some other connection.

Based on the information received from the nodes by central register 510, central register 510 forms the description, or "the image" of the network. This description may be of any format suitable for describing the status and the layout of the network, especially the ad hoc parts of the network, which can then be used for determining the optimal route for each requested connection. More than one server may be used by the operator to perform the role of central register 510. According to this particular example, central register 510 will form a description of all Bluetooth, WLAN or other ad hoc connection capable nodes and their connections received from the mobile nodes (515, 520, 525, and 530).

When using the services provided by the cellular network, the nodes communicate by first asking assistance from the cellular network, i.e. a central register as in this example. Depending on the service and QoS of the node, the central register returns an answer optimized for the node, which can be either a single/multi hop connection route to the destination or a recommendation to use the cellular connection. This answer may comprise one or more messages, which may be signaling or data messages.

The operator (or other third party organization) may charge for the operator controlled service. These operator controlled ad hoc communication services can be used for any local communication applications like local voice-, messaging-, file transfer- or other data services. As a specific example, Local Multimedia Messaging enables the use of non-cellular radio (such as Bluetooth) in a multimode cellular media phone for local multimedia messaging communications. When sending a multimedia message from a media phone, the client software contacts cellular network, in example a central register (such as a server) in the operator's network to check, whether the receiver is in a few hop environment in the non-cellular ad hoc network, and if so, sends the message over the non-cellular radio, instead of the cellular network.

The operator may, with a minimum investment, offer to users "free local multimedia messaging". This attracts users to the network and the users would familiarize with the multimedia messaging by sending them at first mainly locally. Users may also use the multimedia messaging over a cellular connection. This increased volume of normal multimedia messaging is a major benefit for the operator. According to one embodiment of the invention, the pricing of the service is based on the amount of assistance required by the cellular network. This operator-assisted service consumes a negligible part of cellular network capacity (<5% of the multimedia messaging traffic).

Figure 6:
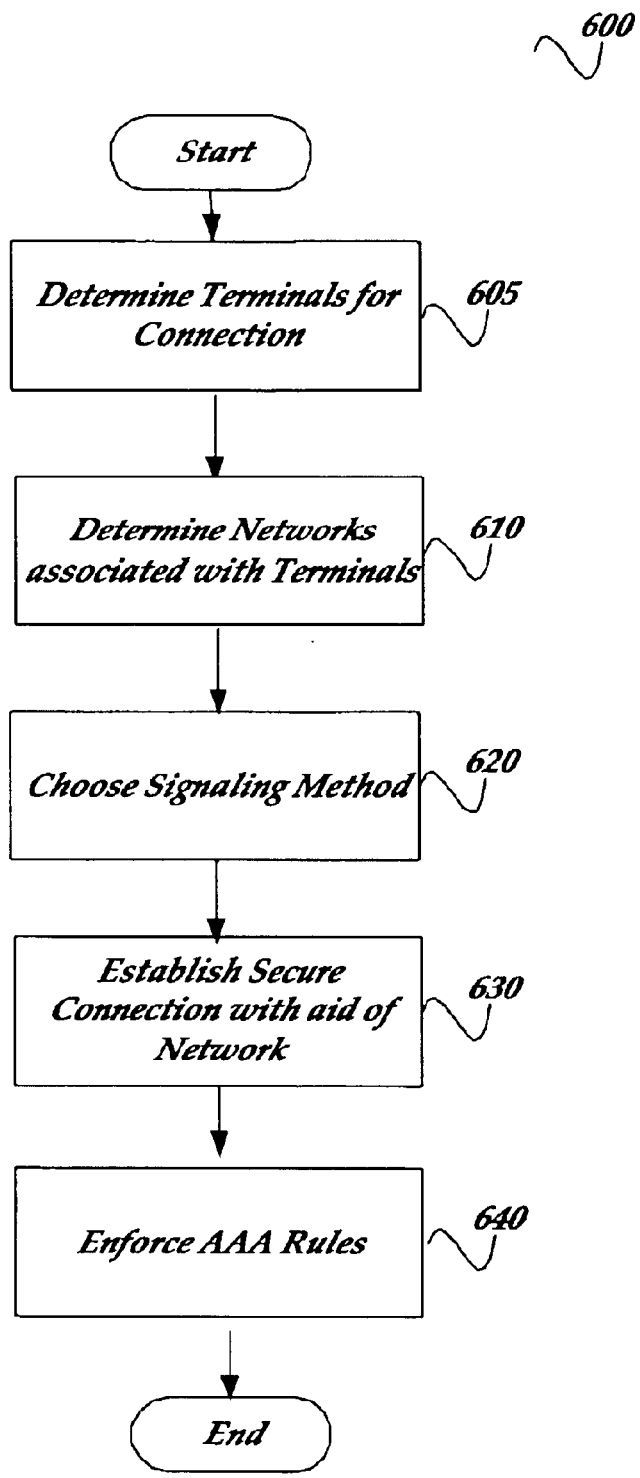
FIG. 6 illustrates a process for ad hoc networking of terminals over a Non-cellular interface aided by a cellular network, in accordance with aspects of the invention.

FIG. 6 illustrates a process for ad hoc networking of terminals over a non-cellular interface aided by a cellular network, in accordance with aspects of the invention. After a start block, the process moves to block 605, at which point the process determines the identities of the terminals desiring to establish an ad hoc link. Transitioning to block 610, the process determines the networks associated with the terminals. For example, a terminal may be coupled to a non-cellular network, a cellular network, or both. Moving to block 620, a signaling method is chosen for the terminals. The signaling method is related to the networks the terminal is coupled too. For example, non-cellular only terminals, the signaling is transported over a non-cellular access network. For dual-mode terminals that may communicate over non-cellular and cellular networks, the signaling may be transported either over the non-cellular link to non-cellular access network or cellular link to cellular access network. Both terminals do not have to use the same access network for the signaling. For example, one terminal could use a non-cellular access network and another terminal may use a cellular access network. Flowing to block 630, a secure connection is established between the terminals with the aid of the cellular network. The information transferred over the signaling link to cellular network may include many different types of information. For example, the information may include user authentication, user ID retrieval and mapping (e.g., WLAN interface MAC address from MSISDN or RF Tag's address), security parameters allowing for secure non-cellular ad hoc link establishment, radio resource management messages, and the like. Transitioning to block 640, once the secure connection is established and the network is aware of the ad hoc non-cellular connection, the rules may be enforced. For example, the users of the terminals may be charged based on the flow of information and data between the terminals using the ad hoc non-cellular connection. The process then steps to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for ad hoc networking of terminals over a non-cellular interface aided by a cellular network, comprising:
    determining the identities of the terminals desiring to establish an ad hoc link;
    determining a network associated with the terminals;
    choosing a signaling transport for the terminals;
    establishing a secure connection between the terminals with the aid of the cellular network;
    receiving update information relating to the terminals; and
    forming a description of an ad hoc network in response to receiving the update information.

2. The method of claim 1, further comprising enforcing rules relating to the ad hoc link.

3. The method of claim 1, wherein determining the identities of the terminals desiring to establish an ad hoc link further comprises using a cellular infrastructure.

4. The method of claim 1, wherein determining the identities of the terminals desiring to establish an ad hoc link further comprises receiving an identifier from the terminal.

5. The method of claim 1, wherein determining the network associated with the terminals, further comprises determining when a terminal is coupled to a non-cellular network and determining when the terminal is coupled to a cellular network.

6. The method of claim 5, wherein the cellular network associated with the terminal is contacted over multi-hop signaling.

7. The method of claim 5, wherein choosing the signaling transport media for the terminals, further comprises choosing a non-cellular access network to carry the signaling for non-cellular-only terminals.

8. The method of claim 5, wherein the signaling for the terminals may be carried across a cellular radio access network.

9. The method of claim 1, further comprising determining when a terminal desires to communicate, and when: the terminal asking assistance from a central register; and providing the terminal with an answer optimized for the terminal.

10. The method of claim 9, wherein providing the terminal with the answer optimized for the terminal, further comprises providing a route to the terminal.

11. The method of claim 10, wherein the route may be a single hop connection route or a multi-hop connection route or a recommendation to use the cellular network.

12. The method of claim 9, further comprising charging for the aid of the cellular network.

13. A method for ad hoc networking of terminals over a non-cellular interface aided by a cellular network, comprising:
    determining the identities of the terminals desiring to establish an ad hoc link;
    determining a network associated with the terminals including determining when a terminal is coupled to a non-cellular network and determining when the terminal is coupled to a cellular network;
    choosing a signaling transport for the terminals including allowing a combination of signaling transport media to be used for the terminals; and
    establishing a secure connection between the terminals with the aid of the cellular network.

14. The method of claim 13, further comprising enforcing rules relating to the ad hoc link.

15. The method of claim 13, wherein determining the identities of the terminals desiring to establish an ad hoc link further comprises using a cellular infrastructure.

16. The method of claim 13, wherein determining the identities of the terminals desiring to establish an ad hoc link further comprises receiving an identifier from the terminal.

17. The method of claim 13, further comprising receiving update information relating to the terminals.

18. The method of claim 17, further comprising forming a description of an ad hoc network in response to receiving the update information.

19. The method of claim 13, wherein the cellular network associated with the terminal is contacted over multi-hop signaling.

20. The method of claim 13, wherein choosing the signaling transport media for the terminals, further comprises choosing a non-cellular access network to carry the signaling for non-cellular-only terminals.

21. The method of claim 13, wherein the signaling for the terminals may be carried across a cellular radio access network.

22. A system for ad hoc networking of terminals aided by a cellular network, comprising:
 terminals, wherein the terminals include an interface unit arranged to communicate with a cellular network, wherein the cellular network is configured to:
  communicate with terminals;
  determine the identity of the terminals that desire to establish an ad hoc link;
  determine a network associated with the terminals;
  choose a signaling transport for the terminals; and
  establish a secure link with the terminals; and
 a central register that is configured to receive update information relating to the terminals and is further configured to form a description of an ad hoc network in response to receiving the update information.

23. The system of claim 22, wherein communication with terminals may be selected from a direct communication link and an indirect communication link.

24. The system of claim 22, further comprising a means operative to enforce rules associated with the secure link.

25. The system of claim 22, wherein the central register is further configured to charge for the aid of the cellular network.

26. The system of claim 22, wherein the signaling transport may be over a noncellular access network and a cellular radio access network.

27. The system of claim 26, wherein the cellular network is configured to determine the identity of the terminals that desire to establish an ad hoc link further comprises receiving an identifier from the terminals.

28. The system of claim 27, wherein the identifier may be selected from a group including a user name, a user address, an IMSI code, an ISDN telephone number and an NAL.

29. The system of claim 27, wherein the identifier is communicated over a written note, a verbal communication, an RF tag, and a bar code.

30. The system of claim 22, wherein the cellular network is further configured to authenticate the terminal and deliver at least one encryption key for a secure link establishment.

31. The system of claim 22, wherein the cellular network is further configured to deliver at least one security association token.

32. The system of claim 22, wherein the cellular network is further configured to charge for services provided.

33. The system of claim 22, wherein the central register is further configured to determine when a terminal desires to communicate by receiving a request from a terminal, and when: the terminal configured to ask assistance from the central register; and the central register configured to provide the terminal with an answer optimized for the terminal relating to the communication.

34. The system of claim 33, wherein providing the terminal with the answer, further comprises the central register configured to provide route information to the terminal.

35. The system of claim 34, wherein the route information may be a single hop connection route or a multi-hop connection route or a recommendation to use the cellular network.

36. A system for ad hoc networking of terminals over a non-cellular interface aided by a cellular network, comprising:
 means for determining the identities of the terminals desiring to establish an ad hoc link;
 means for determining a network associated with the terminals;
 means for choosing a signaling transport for the terminals;
 means for establishing a secure connection between the terminals with the aid of the cellular network;
 means for enforcing rules relating to the ad hoc networking;
 means for receiving update information relating to the terminals; and
 means for forming a description of an ad hoc network in response to receiving the update information.

37. A system for ad hoc networking of terminals over a non-cellular interface aided by a cellular network, comprising:
 means for determining the identities of the terminals desiring to establish an ad hoc link;
 means for determining a network associated with the terminals comprising means for determining when a terminal is coupled to a non-cellular network and determining when the terminal is coupled to a cellular network;
 means for choosing a signaling transport for the terminals comprising means for allowing a combination of signaling transport media to be used for the terminals;
 means for establishing a secure connection between the terminals with the aid of the cellular network; and
 means for enforcing rules relating to the ad hoc networking.

* * * * *

UNITED STATES PATENT AND TRADEMARK OFFICE
CERTIFICATE OF CORRECTION

PATENT NO. : 6,904,055 B2
DATED : June 7, 2005
INVENTOR(S) : Roman Pichna et al.

Page 1 of 1

It is certified that error appears in the above-identified patent and that said Letters Patent is hereby corrected as shown below:

Column 1,
Line 38, delete "Bluetootb" and insert -- Bluetooth --.

Column 3,
Lines 62-63, delete "(http://www.ietfor.g/html.charters/aaa-charter.html)" and insert -- (http://www.ietf.org/html.charters/aaa-charter.html) --.

Column 5,
Line 55, delete "services.On" and insert -- services. On --.

Signed and Sealed this

Eleventh Day of October , 2005

JON W. DUDAS
*Director of the United States Patent and Trademark Office*